United States Patent [19]
Henninger

[11] Patent Number: 5,166,628
[45] Date of Patent: Nov. 24, 1992

[54] SLIDING CONTACT ELECTRICAL PATH OR ANGLE SENSOR

[75] Inventor: Helmut Henninger, Mötzingen, Fed. Rep. of Germany

[73] Assignee: helag-electronic GmbH, Nagold, Fed. Rep. of Germany

[21] Appl. No.: 736,529

[22] Filed: Jul. 26, 1991

[51] Int. Cl.$^5$ ............... G01R 27/08; H01C 10/38
[52] U.S. Cl. .................. 324/723; 324/716; 340/870.38; 338/118; 338/202
[58] Field of Search .......... 324/714, 716, 723; 340/870.38; 338/75, 117, 118, 143, 150, 154, 160, 162, 164, 167, 170, 185, 186, 190, 192, 196, 199, 202

[56] References Cited

U.S. PATENT DOCUMENTS

| | | | |
|---|---|---|---|
| 3,364,454 | 1/1968 | Froebe | 338/202 X |
| 4,139,831 | 2/1979 | Ortlieb et al. | 338/118 X |
| 4,817,419 | 4/1989 | Iden | 338/202 X |

FOREIGN PATENT DOCUMENTS

| | | |
|---|---|---|
| 8011367 | 3/1980 | Fed. Rep. of Germany . |
| 3639150 | 9/1980 | Fed. Rep. of Germany . |
| 3441217 | 6/1986 | Fed. Rep. of Germany . |
| 3520199 | 9/1986 | Fed. Rep. of Germany . |

Primary Examiner—Gerard R. Strecker
Assistant Examiner—Diep Do
Attorney, Agent, or Firm—Shenier & O'Connor

[57] ABSTRACT

An electrical path or angle sensor comprises a first, stationary contact segment, a plurality of stationary, second contact segments arranged one behind the other and separated from one another by dividing gaps, these second contact segments being connected to circuit elements, a sliding contact movable in a predetermined direction of movement and displaceable over the contact segments and the dividing gaps dependent on the path or angle, as well as contact tongues formed on the sliding contact and movable therewith, these tongues being aligned with their contact-making points in a contact line and when the sliding contact is moved connecting the first contact segment each time with at least one of the second contact segments in an electrically conductive manner by this line. Either the dividing gaps between the second contact segments or the contact line extend at an inclined angle to the direction of movement of the sliding contact so that in all positions of the latter an electrical connection is ensured between the first contact segment and at least one of the second contact segments.

4 Claims, 6 Drawing Sheets

SLIDING CONTACT ELECTRICAL PATH OR ANGLE SENSOR

The invention relates to an electrical path or angle sensor comprising a first stationary contact segment, a plurality of stationary, second contact segments arranged one behind the other and separated from one another by dividing gaps, these second contact segments being connected to circuit elements, a sliding contact movable in a predetermined direction of movement and displaceable over the contact segments and the dividing gaps dependent on the path or angle, and contact tongues formed on the sliding contact and movable therewith, these tongues being aligned with their contact-making points in a contact line and, when the sliding contact is moved, connecting the first contact segment each time with at least one of the second contact segments in an electrically conductive manner by this line.

In known sensors of this type the dividing gaps and the contact lines extend parallel to one another and mostly at right angles to the direction of movement of the sliding contact. This can lead to the contact line extending exactly in the dividing gap between two second contact segments, in certain positions of the sliding contact, and so none of these contact segments is connected with the first contact segment. In this operative state the sensor cannot, of course, fulfill its function of sensing a path or angle.

The object of the invention is to improve a generic path or angle sensor such that the sliding contact, in all its positions, always connects the first contact segment with one of the second contact segments in an electrically conductive manner.

This object is accomplished in accordance with the invention in that either the dividing gaps between the second contact segments or the contact line extend at an inclined angle to the direction of movement of the sliding contact.

This ensures that the contact line cannot get into a position in which it extends in the dividing gap and parallel to its limits and hereby the first contact segment is not connected with any of the second contact segments.

The following description of a preferred embodiment of the invention serves to explain the invention in greater detail in conjunction with the attached drawings, in which.

Figure 1:
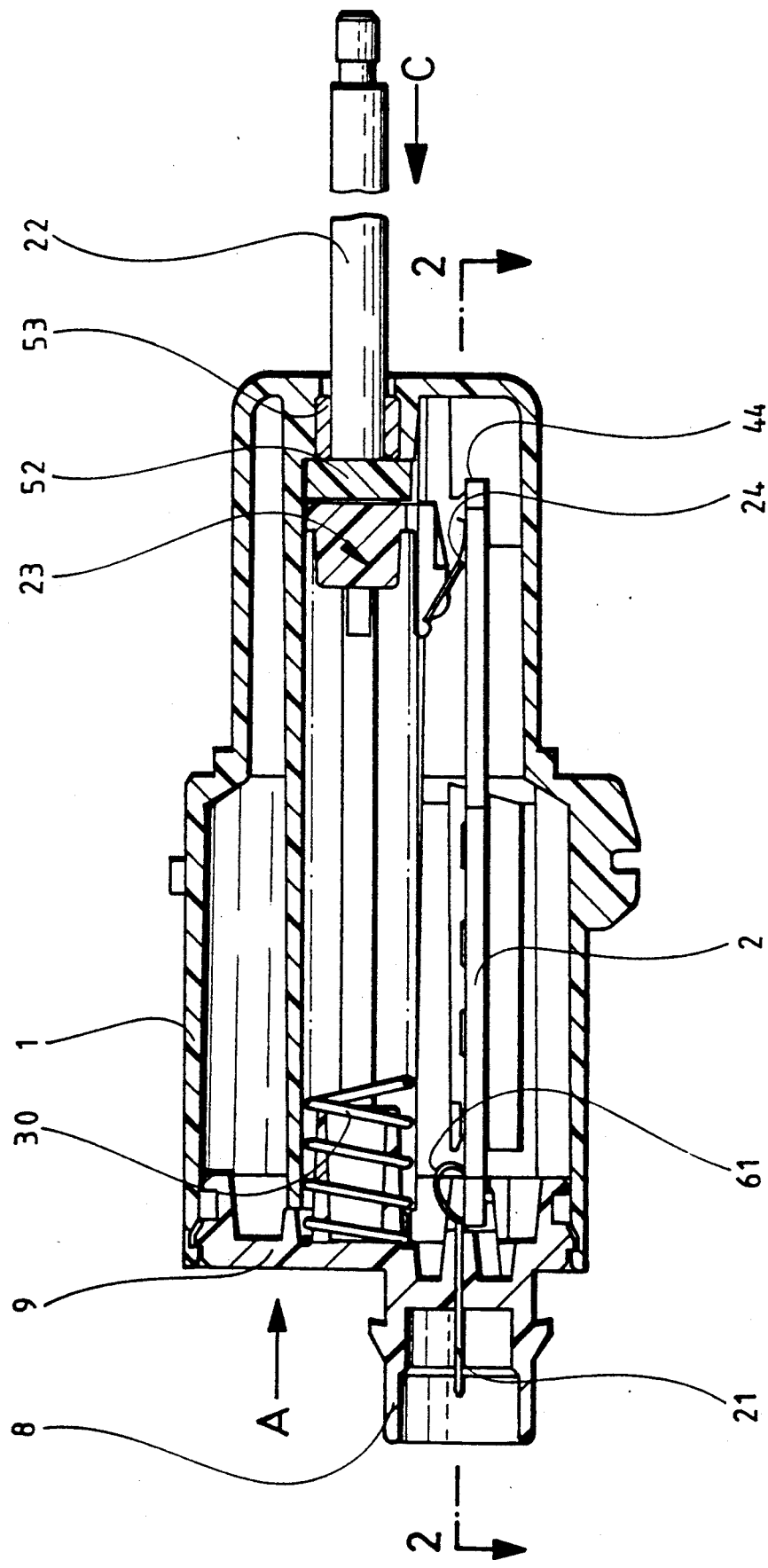
FIG. 1 is the view of a longitudinal section of a path sensor operated in a straight line.
Figure 4:
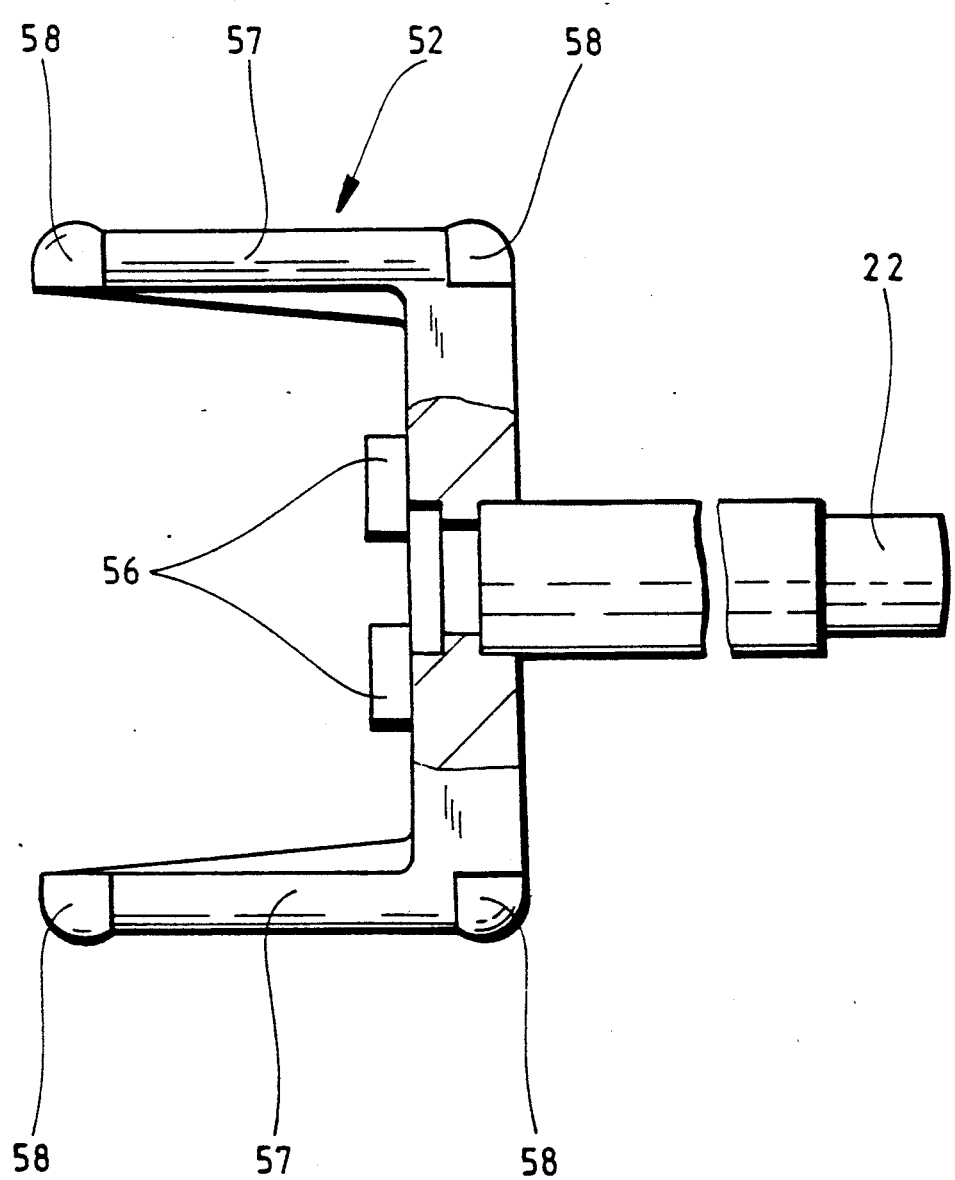
FIG. 4 is a partially cut-away individual view of a drive member for a sliding contact of the path sensor shown in FIG. 1.

The path sensor illustrated in the drawings, which can, for example, be connected to the brake pedal of a motor vehicle to sense the respective travel of the operated pedal in conjunction with an Anti-Blocking System for brakes, comprises a cylindrical housing 1 in which an electrical printed circuit board 2 is securely arranged parallel to the housing axis. The printed circuit board 2, which is individually illustrated in FIG. 2, bears in a manner known per se a plurality of electrical circuit elements (e.g. resistor elements) 3-7, which are connected in the customary manner via printed conductor paths with likewise printed contact segments, namely a first contact segment 10 and a plurality of second contact segments 13-17. The conductor paths, which are not expressly shown in FIG. 4, are connected to connection members 18, 19 of the printed circuit board which are again connected to connection lines of the sensor, of which one connection line 21 is shown in FIG. 1. As illustrated in FIG. 1, the connection lines, e.g. the connection line 21, lead into a socket 8 connected with the housing 1 and a corresponding plug provided with a cable may be introduced into this socket for further electrical connection.

With the aid of a drive rod 22 (FIG. 1), a sliding contact 23 with contact tongues 24, which is held in the end position illustrated in FIG. 1 by a helical spring supported on one side on the sliding contact and on the other side on a cover 9 bearing the socket 8, can be moved in the longitudinal direction over the printed circuit board 2 such that the contact tongues 24 connect the first contact element 10 each time with one of the second contact elements 13-17 in an electrically conductive manner and hereby connect into the circuit one or more of the resistors 3-7 in a manner known per se so that the overall resistance present each time corresponds to a specific position of the sliding contact 23 and therefore to the distance covered by the sliding contact 23 between its end position illustrated i FIG. 1 and this position.

Figure 5:
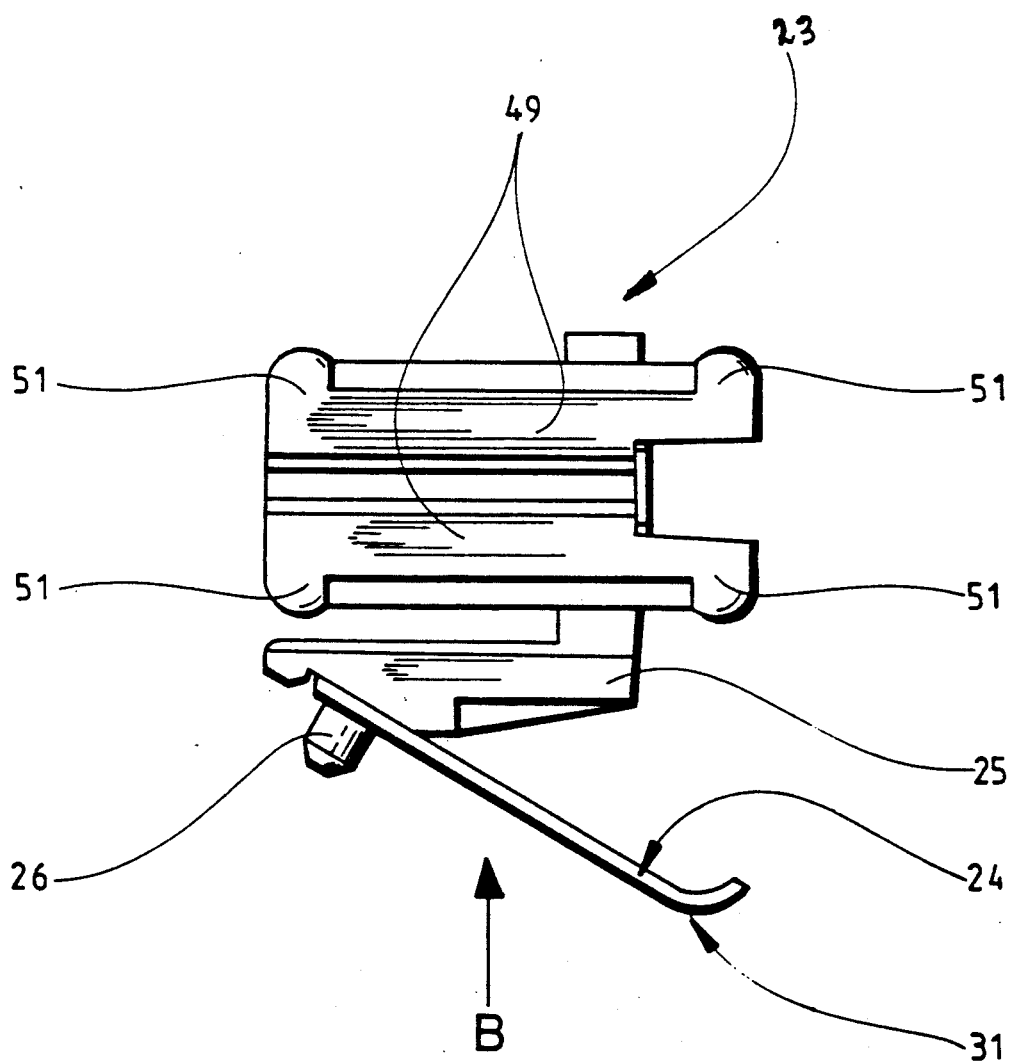
FIG. 5 is a side view of a sliding contact.
Figure 6:
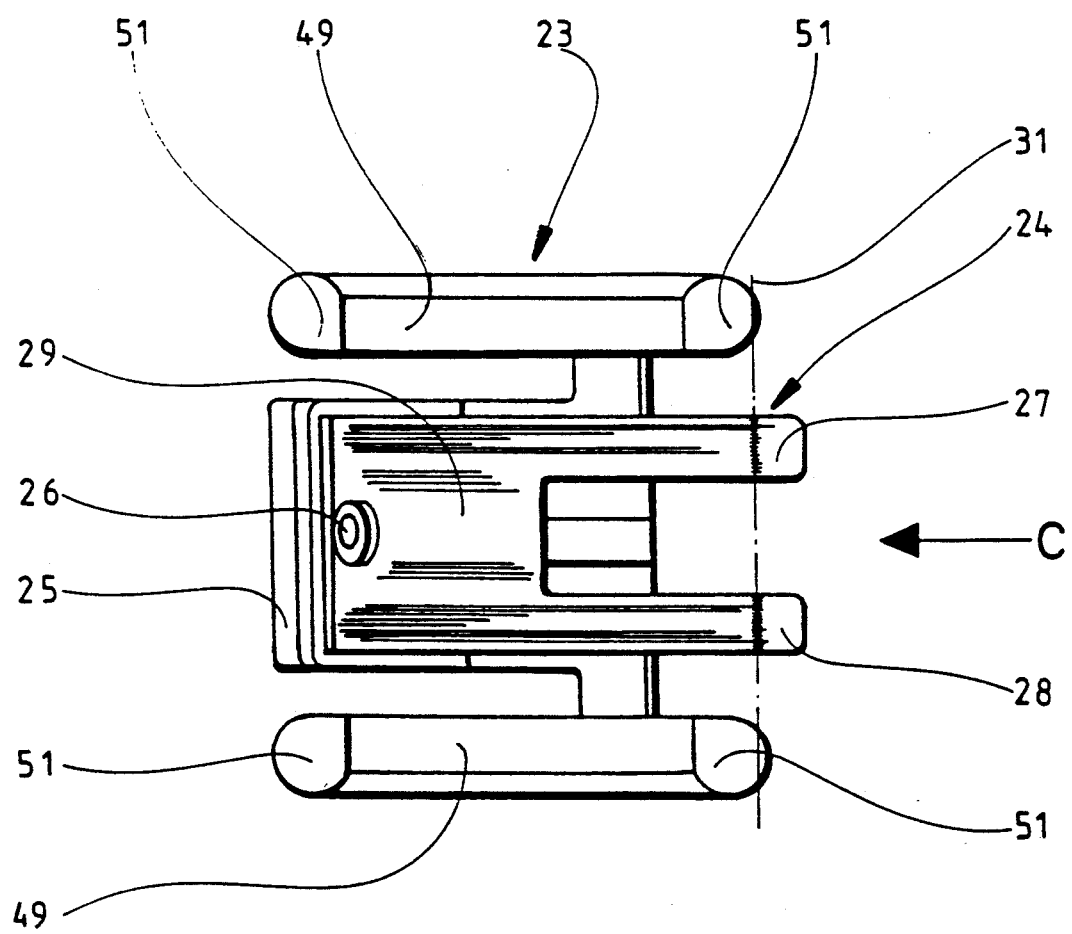
FIG. 6 is a view from below of the sliding contact, seen in the direction of arrow B in FIG. 5.

The design and arrangement of the contact tongues 24 on the sliding contact 23 are apparent from FIGS. 5 and 6. The sliding contact 23 comprises a carrier member 25, to which the contact tongues 24 are attached with the aid of a rivet 26 so as to be inclined downwardly. The individual, relatively narrow contact tongues 24 located next to one another consist in the customary manner of metal and are, as shown in FIG. 6, divided into two groups 27, 28, which are connected with one another via a metallic bridge 29 in an electrically conductive manner. One group 27 of contact tongues slides during displacement of the sliding contact 23 over the first contact segment 10 whereas the other group 28 of contact tongues is moved gradually over one of the second contact segments 13 - 17 so that one of these second contact segments is connected each time with the first contact segment 10 in an electrically conductive manner.

As shown in FIG. 5, the individual contact tongues 24 are slightly curved at their contact-making points. The contact-making points are located, as is apparent from FIG. 6, on a so-called "contact line" 31 which, in the illustrated case, is a straight line.

Figure 2:
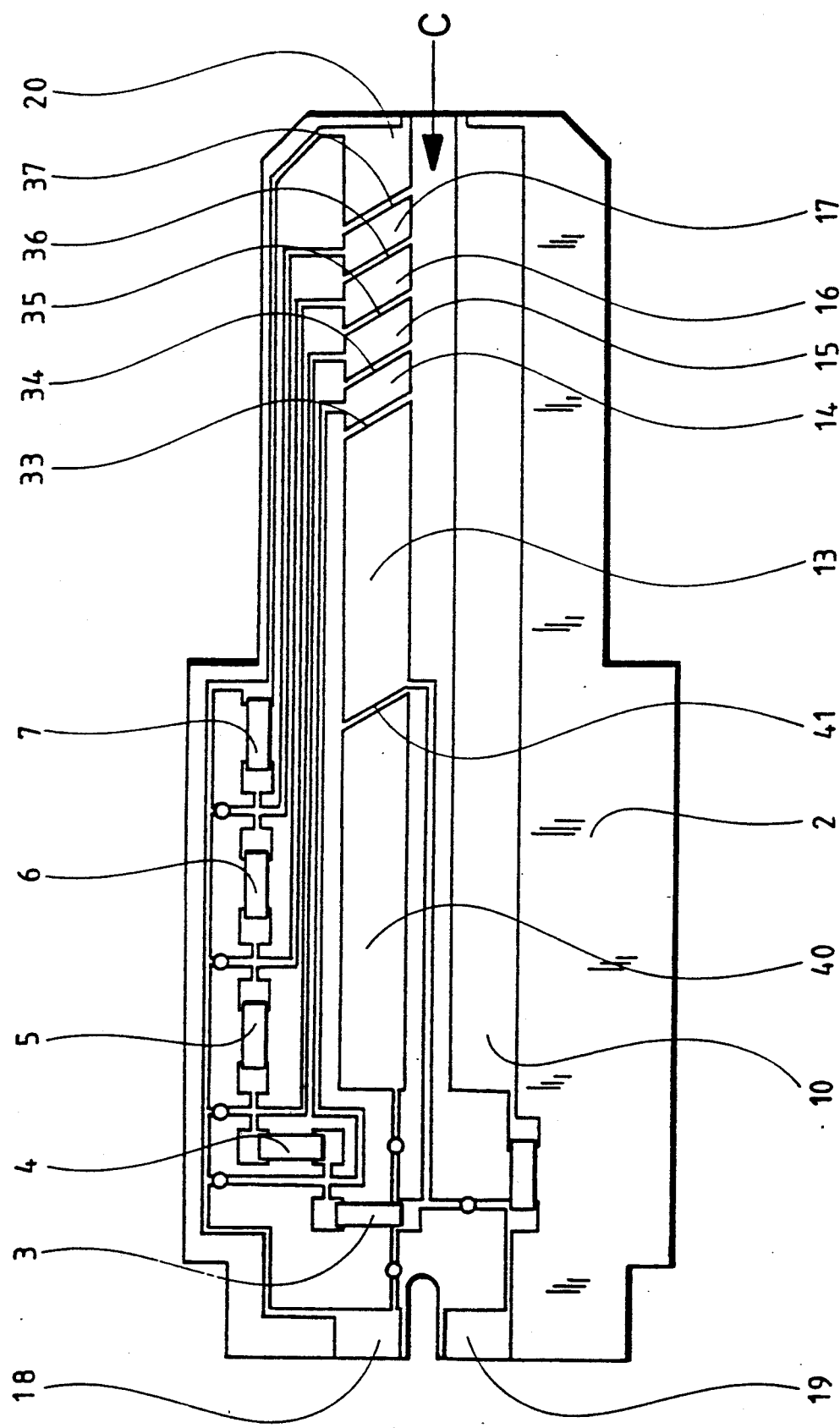
FIG. 2 is a plan view of a printed circuit board along line 2—2 in FIG. 1.

As shown in FIG. 2, dividing gaps 33-37 are provided between each two second contact segments 13-17 and the gaps electrically isolate the individual contact segments from one another. As illustrated, the straight-lined dividing gaps 33-37 are inclined, for example at an angle of between 50° and 70°, to the direction of movement C of the sliding contact 23. The contact line 31 of the contact tongues 24, on the other hand, extends, as shown in FIG. 6, essentially at right angles to the direction of movement of the sliding contact 23. This ensures that the group 28 of contact tongues 24 which have a corresponding width can never lie between two second contact segments 13-17 with its contact line 31. On the contrary, these contact tongues make contact with at least one of the second contact segments 13-17 in every position of the sliding contact 23.

In an equivalent embodiment of the invention, the dividing gaps 33-37 between the second contact segments 13-17 could extend essentially at right angles to the direction of movement C of the sliding contact 23 when, in this case, the contact line 31 of the contact tongues 24 (FIG. 6) extends at an inclined angle to the direction of movement C of the sliding contact 23.

In the illustrated embodiment of a path sensor, this is obviously an apparatus operated linearly or in a straight line in the direction of arrow C. The invention, i.e. the inclined arrangement of either the dividing gaps 33-37 or the contact line 31 relative to the direction of movement C of the sliding contact 23, can, however, be easily transferred to a path or angle sensor which is operated circularly and in which the first and second contact segments are designed as circularly extending paths which are concentric to one another. In this case, the contact line 31 extends, for example, radially to the circular paths of the contact segments while the dividing gaps 33-37 extend at an angle to these radial directions. This achieves the same effect, namely a constant electrical connection between the first and second contact segments via the contact tongues 24 moved along a circular path, as described above on the basis of the embodiment illustrated in the drawings. In any case, the arrangement is such that the dividing gaps 33-37 and the contact line 31 of the contact tongues 24 form between them an angle varying from zero and smaller than 90° because, in this way, it is possible for the contact tongues to connect the first contact segment 10 with at least one of the second contact segments 13-17 in every position, i.e. also in the region of a dividing gap 33-37.

During practical use of the path sensor as described, the drive rod 22 of the otherwise stationary sensor is connected with a control element, for example the brake pedal of a motor vehicle, the distance travelled by which is to be monitored. The necessary electrical connections are provided by the socket 8 and the associated connection lines 21. The resistors 3-7 are, as shown in FIG. 2, connected in series. (Circles in the conductor paths illustrated in FIG. 2 signify electrical breaks in these paths). When the sliding contact takes up the end position illustrated in FIG. 1, it connects the first contact segment 10 with a contact segment 20 which continues the row of second contact segments 13-17, as illustrated in FIG. 2. In this position of the sliding contact, the resistors 3-7 are by-passed, as shown by the course of the conductor paths in FIG. 2, so that a direct current connection is provided between the connection members 18 and 19. When the sliding contact 23 is moved successively over the second contact segments 13-17, the resistors 3-7 are connected in one after the other so that the overall resistance is correspondingly increased in steps. This stepwise increase in resistance is utilized in a customary manner for measurement technology to determine step by step the position of the sliding contact 23 and, with it, the distance travelled by the drive rod 22.

As is apparent from FIG. 2, an additional contact segment 40 is located at the end of the row formed by the second contact segments 13-17. This additional contact segment is not connected with any of the resistors 3-7 but is arranged unconnected on the printed circuit board 2. This contact segment 40 is also separated from the adjacent contact segment 13 by an inclined dividing gap 41 corresponding to the dividing gaps 33-37. Consequently, when the sliding contact 23 is moved over the contact segment 13 towards its second end position beyond the dividing gap 41 and finally comes to rest on the contact segment 40, rubbings resulting from travel over the contact segments 13-17 and adhering to the contact tongues 24 will be deposited in the dividing gap 41 at the latest when the sliding contact 23 returns in the direction of the end position shown in FIG. 1. It has been found that soiling of the remaining dividing gaps 33-37 can be appreciably reduced due to the arrangement of the dividing gap 41 between the second contact segment 13 and the unconnected contact segment 40 and, therefore, the working life of the path sensor can be considerably extended.

Figure 3:
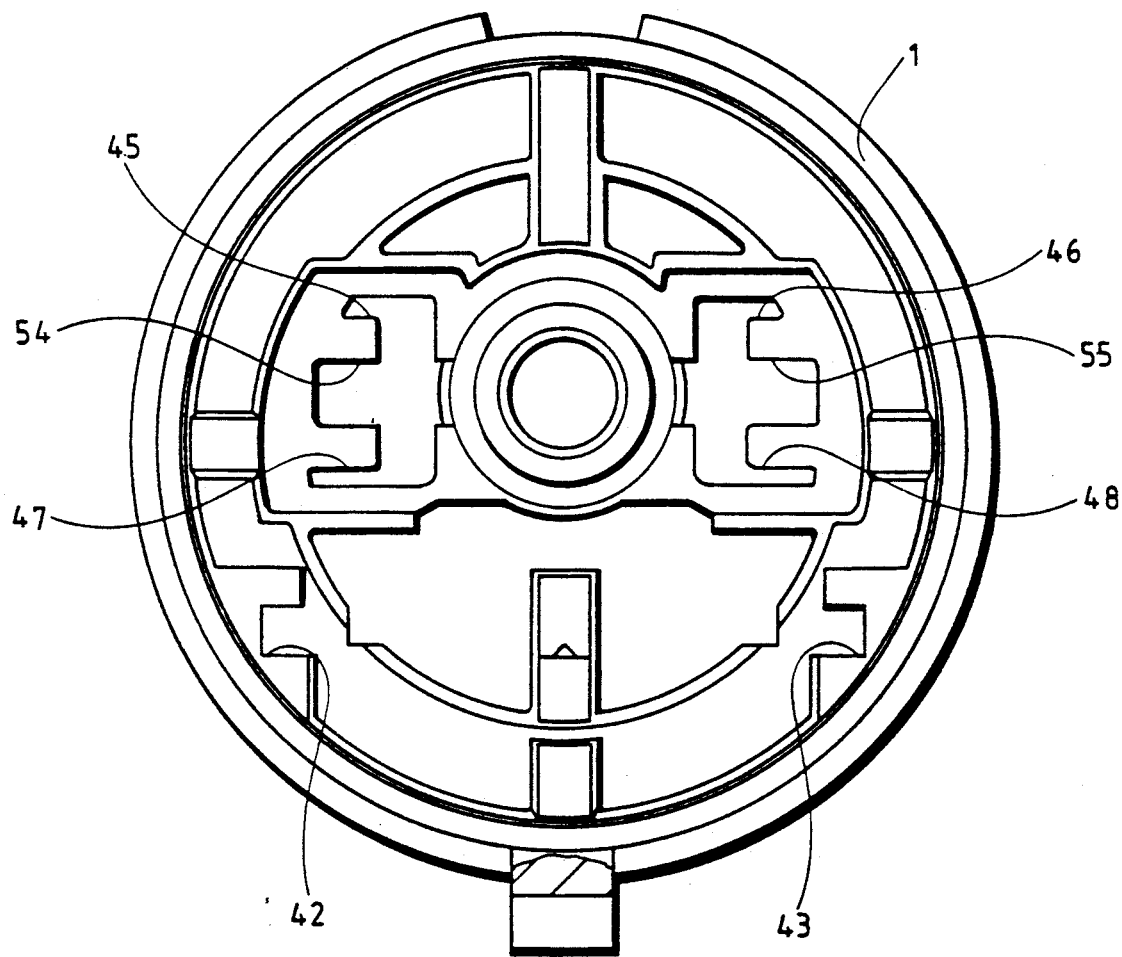
FIG. 3 is a front view of the path sensor from FIG. 1, seen in the direction of arrow A in FIG. 1 and with the cover removed.

The housing 1 of the path sensor is designed as a plastic molded part, the cross-sectional shape of which is apparent from FIG. 3. Two first grooves 42, 43 serve for insertion of the printed circuit board 2 into the housing 1. The printed circuit board 2 arranged in the grooves 42, 43 is secured in position in the housing 1 between a stop 44 (FIG. 1) in the vicinity of one side of the housing 1 and the cover 9 which, for its part, can be locked in position with the adjacent edge of the housing 1.

As shown in FIG. 3, the housing 1 comprises two additional sliding guide means which, in accordance with the grooves 42, 43, are each formed by grooves 45, 46 and 47, 48, respectively, arranged on the same level. The sliding contact 23 (FIG. 5) is mounted in these two sliding guide means for sliding displacement and its carrier member 25 is provided for this purpose with corresponding slide runners 49 located in the grooves 45-48 and each having spherical ends 51. A drive member 52 (FIGS. 1 and 4) is displaceably connected with the carrier member 25 and has secured to it the drive rod 22 which is displaceable in a sliding sleeve 53 (FIG. 1) of the housing 1. The drive member 52 is displaceably guided in its own sliding guide means which is parallel to the two sliding guide means formed by the grooves 45-48 and is formed by the grooves 54, 55 (FIG. 3).

This means that the sliding contact 23 has altogether three separate slide paths, i.e. firstly, the sliding guide means formed by the grooves 45-48, secondly, the sliding guide means formed by the grooves 54, 55 and, thirdly, the sliding guide means formed by the sleeve 53. The sliding contact 23 is movably connected to the drive member 52 in such a way that two projections 56 of the fork-like drive member 52 (FIG. 4) loosely and displaceably engage in corresponding recesses in the end face of the sliding contact 23. The separate sliding guide means for the sliding contact 23, on the one hand, and for the drive member 52, on the other, as well as the loose connection between these parts 52 and 23 ensure that when the sleeve 53 and, possibly, the sliding guide means formed by the grooves 54, 55 no longer provide an exact, straight-lined guidance as a result of wear and tear, the sliding contact is still held by its sliding guide means formed by the grooves 45-48 on its predetermined, straight-lined path parallel to the printed circuit board 2 and the contact segments 10, 13-17 and 20.

As illustrated in FIG. 4, the fork-like drive member 52 also has slide runners 57 with spherical ends 58, with which the drive member 52 slides in the sliding guide means formed by the grooves 54, 55. The spherical ends 58 (like the spherical ends 51 of the sliding contact 23) allow sliding movement with a minimum of friction.

As shown, finally, in FIG. 1, the connection line 21 secured in the cover 9 is connected with one of the connection members 18, 19 of the printed circuit board (FIG. 2) via a flexible electrical connecting line 61 so that the connection line 21, in particular, is not directly soldered to one of the connection members 18, 19. It has been found that the path sensor as illustrated and described is often subjected during practical use (for example, in a motor vehicle) to constant vibrations which can result in a solder connection between connection line 21 and one of the members 18, 19 becoming separated. This is not the case with the flexible connecting line 61.

What is claimed is:

1. An electrical path or angle sensor comprising a first stationary contact segment, a plurality of stationary second contact segments arranged one behind the other and separated from one another by dividing gaps, said second contact segments being connected to circuit elements, a sliding contact movable in a predetermined direction of movement and displaceable over the first and second contact segments and the dividing gaps dependent on the path or angle, and first and second groups of tongues formed on the sliding contact and movable therewith, said groups of contact tongues being connected with one another via a metallic bridge member in an electrically conductive manner, the first group contacting the first contact segment, the second group contacting the second contact segments, said tongues of each group being aligned with their contact-making points in a straight contact line and when the sliding contact is moved connecting the first contact segment each time with at least one of the second contact segments in an electrically conductive manner by this line, characerized in that either the dividing gaps (33, 34, 35, 36, 37) between the second contact segments (13, 14, 15, 16, 17) or the contact line (31) extend at an inclined angle to the direction of movement (C) of the sliding contact (23);

that said sliding contact (23) comprises a carrier member (25) provided with slide runners (49) each having spherical ends (51);

that said path sensor comprises a housing (1) having first sliding guide means comprising separate first grooves (45, 46, 47, 48) respectively receiving said spherical ends (51) of said carrier member slide runners (49);

that said path sensor comprises a drive member (52) movably connected with said carrier member (25);

that said drive member (52) is provided with slide runners (57) having spherical ends (58);

that said housing (1) has second sliding guide means comprising second separate grooves (54, 55) respectively receiving said spherical ends (58) of said drive member slide runners (57); and that said patch sensor comprises a drive rod (22) connected with said drive member (52) and a guiding sleeve (53) separately guiding said drive rod (22).

2. Sensor as defined in claim 1, characterized by an additional, unconnected, second contact segment (40) at the end of the connected, second contact segments (13, 14, 15, 16, 17) arranged one behind the other and a dividing gap (41) arranged betwen the unconnected contact segment and the adjacent connected contact segment for depositing the rubbings caused by the sliding contact (23).

3. Sensor as defined in claim 1, characterized in that the contact segments (10, 13, 14, 15, 16, 17, 20, 40) and the electrical circuit elements (3, 4, 5, 6, 7), in particular resistor elements, are arranged on a printed circuit board (2) and a flexible, electrical connecting line (61) is provided between at least one connection line (21) of the path sensor and an electrical connection member (18, 19) of the printed circuit board (2).

4. Sensor as defined in claim 3, characterized in that a slide path formed by grooves (42, 43) is formed in the housing (1) for insertion of the printed circuit board.

* * * * *

UNITED STATES PATENT AND TRADEMARK OFFICE
CERTIFICATE OF CORRECTION

PATENT NO. : 5,166,628
DATED : November 24, 1992
INVENTOR(S) : HELMUT HENNINGER It is certified that error appears in the above-identified patent and that said Letters Patent is hereby corrected as shown below:

Column 6, line 19 - "patch" should read -- path --.

Signed and Sealed this

Fifth Day of October, 1993

*Attest:*

BRUCE LEHMAN

*Attesting Officer*  *Commissioner of Patents and Trademarks*